Figure 1:
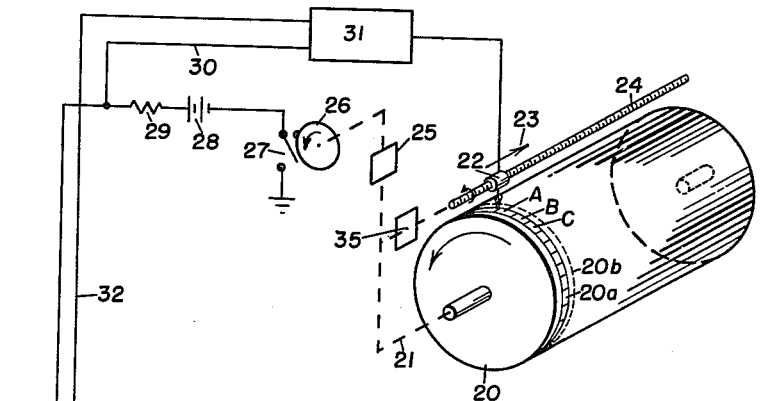

Feb. 5, 1963    C. I. ALEXANDER    3,076,518
RECORDING OF WELL LOGGING DATA
Filed Dec. 4, 1958

CHARLES I. ALEXANDER
INVENTOR.

BY
ATTORNEY

United States Patent Office 3,076,518
Patented Feb. 5, 1963

3,076,518
RECORDING OF WELL LOGGING DATA
Charles I. Alexander, Dallas, Tex., assignor, by mesne assignments, to Socony Mobil Oil Company, Inc., New York, N.Y., a corporation of New York
Filed Dec. 4, 1958, Ser. No. 778,125
4 Claims. (Cl. 181—.5)

This invention relates to acoustic well logging and more particularly to recording in reproducible form time-spaced logging data while eliminating from the recording the dead time between successive components of the data.

In acoustic velocity well logging it has been found desirable to be able to record the acoustic signals utilized for velocity measurements for subsequent treatment. In systems such as illustrated in Patent No. Re. 24,446 to Summers, a co-worker of applicant, the acoustic signals are employed for the production of an output indication which is representative of the time of travel of an acoustic pulse over a short segment of earth formations adjacent the borehole.

It is an object of the present invention efficiently to provide for the recording of the signals as they appear from the acoustic detectors in the borehole. Recording itself presents no unusual problem in view of the existing state of the art. However, the problem of efficiently utilizing a recording medium to accommodate all the data obtained in a velocity well logging operation is not readily overcome. In the ordinary course of acoustic well logging operations, acoustic pulses would be generated at the rate of about 1 to 20 per second. Measurements are taken of the amplitude, frequency and/or transit time of a received acoustic pulse after travel over a relatively short earth segment. The actual time of transit may be of the order of about 1800 microseconds or less. Thus there are long periods of time between successive measurements. Conventional recording systems would utilize unnecessary amounts of the recording medium.

In accordance with the present invention there is provided a system for logging acoustic properties of the earth wherein acoustic pulses periodically are generated as an exploring unit, including spaced-apart tranducers, is moved along the length of a well bore containing fluids. More particularly, there is provided the combination of a support means for receiving a recording medium with a recording element disposed adjacent thereto. Drive means are provided for rotating the support means for cyclic travel of the medium past the recording element with a period greater than the period between the acoustic pulses by an amount slightly in excess of the time of travel of the acoustic pulses through the fluid in the borehole between the most remote of the transducers. The exploring unit and the recording element may also be energized at spaced-apart time intervals each equal to a predetermined multiple of the period of said medium plus an incremental interval which in time is slightly greater than said time of travel of the acoustic pulses through the fluid in the borehole between the most remote of said transducers.

More specifically, there is provided a logging system wherein acoustic pulses are periodically generated as an exploring unit including a plurality of acoustic transducers is moved along the length of a well bore. A recording medium is adapted to be driven cyclically past a recording point. Means are then provided for selectively recording signals on the recording medium at predetermined separate segments of the medium on successive cycles of travel of the medium past the recording point. Each of the segments is so arranged as to have a length of the order of the ratio of the velocity of the recording medium relative to the recording point multiplied by the spacing between the most remote of said acoustic transducers divided by the velocity of sound in the fluid in the well bore. Recording of signals from said transducers is initiated in predetermined time relation with the appearance of each acoustic pulse at said transducers.

Figure 2:
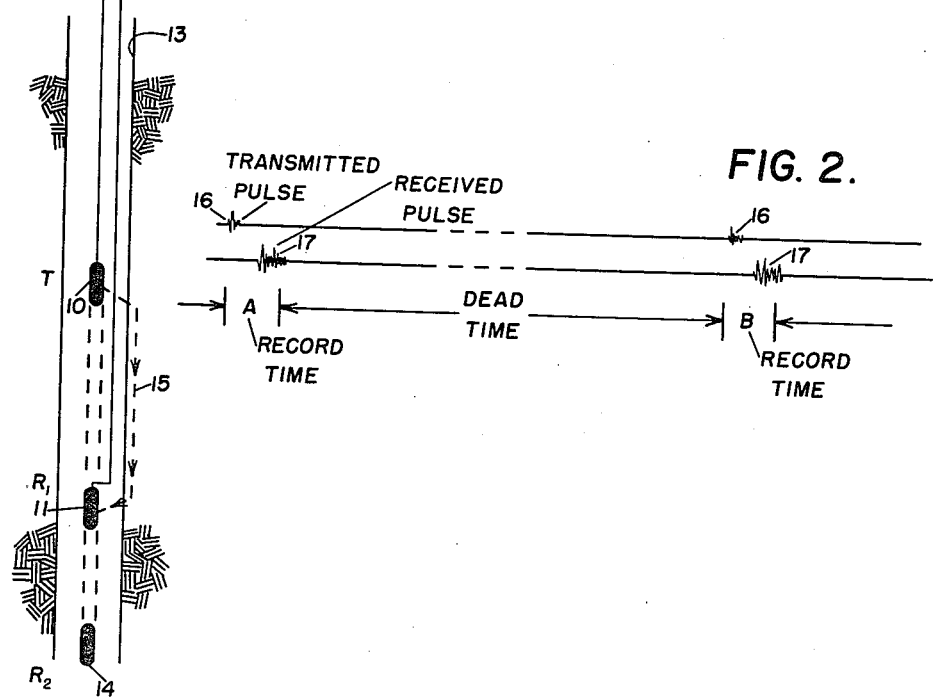

For a more complete understanding of the present invention and for further objects and advantages thereof, reference may now be had to the following description taken in conjunction with the accompanying drawings in which:

FIG. 1 schematically illustrates a acoustic well logging system employing the present invention with a logging tool shown in a borehole; and FIG. 2 is a time plot of signals to be recorded in accordance with the present invention.

Referring now to FIG. 1, two transducers 10 and 11 are supported by cable means 12 in a borehole 13 and are adapted for movement along the length of the borehole 13 while acoustic pulses are produced at a periodic repetition rate. In the form illustrated the transducer 10 may be considered to be a transmitting transducer or pulse generator. Transducer 11 may be considered to be a pulse receiver. As indicated in Patent No. Re. 24,446 above referred to, acoustic pulses generated by transmitter 10 travel to the borehole wall and down through the earth formations and thence through the borehole as along path 15 (shown dotted) where the pulses are received. Such transmitted pulses are illustrated in FIG. 2 as pulses 16 along with the received pulses 17. Pulses 16 are generated at periodic intervals and are spaced a substantial time interval apart. In practice, pulses 16 may be generated at a rate of from about 1 to 20 pulses per second. The received pulses 17 will appear at the receiving transducer 11 at a time following each transmitted pulse dependent upon the spacing between transmitter 10 and receiver 11 and the velocity of sound along the travel path 15. Generally the velocity of sound along path 15 is greater than the velocity of sound in the borehole fluids. Thus, the first energy reaching receiver 11 will be by way of path 15. In environments in which the formation velocity does not exceed the fluid velocity, the first energy will travel by way of the fluid path. In such environment logging of formation properties becomes most difficult and in the present state of the art is not considered reliable. In accordance with the present invention signals representative of the pulses 17 are generated by the transducer 11 and recorded within a time interval following each transmitted pulse 16 which is of the same order of magnitude and preferably slightly greater than the time required for an acoustic pulse to travel from transmitter 10 to receiver 11 by way of the fluid in the borehole.

It is further an object of the invention to eliminate the effect of the relatively long periods or dead time between the end of the desirable information in pulse 17 and the generation of the succeeding pulse 16. When the spacing between transmitter 10 and receiver 11 is of the order of six feet, the recording time A would be of the order of 1200 microseconds. Such a record time would permit the transmission of a pulse by transmitter 10 and the reception of the first break or the first energy of such a pulse by receiver 11 when traveling through the water or liquid at a velocity of 5,000 feet per second. Thus where the pulse repetition rate is 20 pulses per second, the dead time would be of the order of forty times the record time.

In order to utilize recording medium for recording the time intervals of interest and to eliminate the dead time, applicant has provided a system in which a magnetic recording system including drum 20 is employed. Drum 20 is rotated about axis 21 preferably at a uniform speed. The recording head 22 is mounted for movement lengthwise along the periphery of drum 20 as indicated by arrow 23. A screw 24 is provided to move the recording head 22 along a path which is parallel to the axis 21. The rotational motion of the drum 20 about axis 21 is synchronized as by means of a gear train 25 (shown in block form) to a control cam 26 which serves to close a switch 27 periodically to actuate transmitter 10. Upon closure of switch 27, a pulse of current flowing from battery 28 through resistor 29 produces a first control pulse which is applied by way of conductor 30 to a unit 31 which is hereinafter described. The latter pulse will be coincident with the transmitted pulse 16.

The acoustic pulse generated by transmitter 10 travels by way of path 15 as well as other paths to receiver 11. The signals representative of the pulses 17 generated by the receiver upon receipt of the pulse are transmitted by way of signal channel 32 to the unit 31. A signal is thus provided at the output of unit 31 which may comprise the combination of a control pulse or signal occurring coincident with the onset of pulse 16 and signals representative of the pulses 17 as plotted in FIG. 2. The signals are then applied to the recording head 22 for recording on the periphery of drum 20. The unit 31 may provide a signal which is either frequency-modulated or is suitably controlled as to amplitude for direct magnetic recording on drum 20.

Further in accordance with the present invention, the unit 31 is so adapted as to initiate the recording of signals from receiver 11 at a time coincident with the appearance of the acoustic pulse at transmitter 10, that is, coincident in time with the control pulse produced across resistor 29. The recording of signals from receiver 11 continues for a time interval represented by the record time interval A, FIG. 2, which preferably is slightly greater than the time required for an acoustic pulse to travel through the water path directly between transmitter 10 and receiver 11. By this means there will be recorded any signals traveling by way of the formation which are the principal paths of interest insofar as the acoustic log is concerned.

Record time A has been indicated as a first segment of a first recording track 20a on recording drum 20. Preferably the gear mechanism 25 will be so arranged as to permit the recording of segment A which begins upon a first closure of switch 27 at an instant when the first portion of the latter segment is in registration with or coupled to the recording head 22.

The drum 20 may make a predetermined number of revolutions between successive closures of switch 27. Gear mechanism 25 is so arranged that upon the next succeeding closure of switch 27 the initial portion of the second record segment B will be in registration with or coupled to the recording head 22. The beginning of record time B would then be immediately adjacent and contiguous the end of record time A. Thus the dead time illustrated in FIG. 2 will be completely eliminated insofar as the resultant record is concerned.

In the practice of velocity well logging as disclosed in said Summers Patent Re. 24,446, it would be desired that the switch 27 would be closed at least about once for every foot of length of the borehole 13 traversed by the transmitter 10 and receiver 11. The drum 20 would make any selected number of revolutions in the interval required for the transmitter and receiver to cover the selected distance. It only would be required that upon subsequent closures of switch 27 the track 20a would be effectively advanced by a distance equal to the length of one of the segments.

There is also provided a record head control unit 35, which may include a stepping device, which is provided to advance the recording head 22 along the length of the recording drum 20 at a rate such that the recording head will be moved from recording track 20a to a second track 20b by the time the combined lengths of segments A, B, C, etc., equal the circumference of the drum 20. As shown in the drawings, movement of the recording head may be continuous as through continuous rotation of the screw 24.

It will now be appreciated that the present invention is applicable to multi-receiver acoustic well logging systems as well as the single receiver system shown in the drawings. In either case, a logging system is employed wherein acoustic pulses are periodically generated in dependence upon a control function such as closure of switch 27 as the exploring unit is moved along the length of the well bore. The exploring unit may include a second receiving transducer 14 as well as receiver 11. The recording medium, as on the drum 20, is cyclically driven past the recording head or recording point 22. The unit 31, actuated in response to the pulse on channel 30, is adapted to record signals on the drum 20 at predetermined separate segments of the medium which will be presented at the recording point on successive cycles of rotation thereof where each of the segments has a length of the order of the ratio of the speed of the recording medium relative to the recording element multiplied by the spacing between a selected pair of the transducers in unit 10 divided by the velocity of sound in the fluids in the borehole. In a single receiver system said spacing will be the distance between the transmitter 10 and the receiver 11. In a two receiver system the spacing preferably will be the spacing between transmitter 10 and the second receiver 14.

The unit 31 initiates the recording of the signals from one of the transducers, the receiver 11, in predetermined time relation with the appearance of an acoustic pulse at the first of the transducers, such as transducer 10, where said first transducer is located or positioned ahead of the second of the transducers, the receiver 11, along the path of the acoustic pulses.

Unit 31 may be of the form of a multivibrator controlled gate which is rendered open as to transmit signals on channel 32 to recording head 22 during time intervals beginning with the control pulse on channel 30 and ending a predetermined time interval thereafter where such time interval equals the record time A. A monostable multivibrator or a phantastron control unit such as known in the art may be so employed to pass signals from receiver 11 to the recording head 22.

Having described the invention in connection with the specific embodiments shown in the drawings, it will now be apparent to those skilled in the art that further modifications may now be made therein and it is intended to cover such modifications as fall within the scope of the appended claims.

What is claimed is:

1. An acoustic logging system for logging the formation surrounding a borehole containing fluid, comprising a cyclically driven recording drum supporting a recording medium, an exploring unit supported in said borehole and including a transmitter for generating an acoustic pulse and a transducer spaced a fixed distance from said transmitter for generating signals representative of the character of said acoustic pulse received by said transducer by way of said formation and said fluid, a first means connected with said transmitter and with said drum for periodically energizing said transmitter during different cycles of said drum and for generating a control pulse coincident with said acoustic pulse, a recording element adjacent said medium, a circuit interconnecting said element, said first means and said transducer for recording said control pulse on said medium and for recording said transducer signals on said medium, and a second means in said circuit for applying to said element said control pulse and said transducer signals for a period of time which is slightly greater than the time required for an acoustic pulse to travel said fixed distance between said transmitter and said transducer by way of said fluid.

2. An acoustic logging system for logging the formation surrounding a borehole containing fluid, comprising a cyclically driven recording drum supporting a recording medium, an exploring unit supported in said borehole and including a transmitter for generating an acoustic pulse and a transducer spaced a fixed distance from said transmitter for generating signals upon the receipt of said acoustic pulse through said formation and said fluid, a first means connected with said transmitter and with said drum for periodically energizing said transmitter during different cycles of said drum and for generating a control pulse coincident with said acoustic pulse, a recording element adjacent said medium for recording on each of successively adjacent segments on said recording medium said control pulse and said transducer signals, a circuit interconnecting said first means, said transducer, and said recording element, and a second means in said circuit for applying to said recording element said control pulse and said transducer signals for recording for a period of time which is slightly greater than the time required for an acoustic pulse to travel said fixed distance between said transmitter and said transducer by way of said fluid.

3. The system of claim 2 including means connected to said element for producing movement of said recording element relative to said medium in a direction perpendicular to the direction of travel of said medium for varying the lateral position of said segments on said medium.

4. An acoustic logging system for logging the formation surrounding a borehole containing fluid, comprising a cyclically driven recording drum for supporting a recording medium, an exploring unit supported in said borehole and including a transmitter for generating an acoustic pulse and a transducer spaced a fixed distance from said transmitter for generating signals upon the receipt of said acoustic pulse through said formation and said fluid, a first means interconnected with said transmitter and with said drum for energizing said transmitter at spaced apart time intervals each equal to a predetermined multiple of the period of each cycle of said drum plus an incremental interval which in time is slightly greater than the time required for an acoustic pulse to travel between said transmitter and said transducer by way of said fluid and for generating a control pulse coincident with said acoustic pulse, a recording element adjacent said medium, a circuit interconnecting said element, said transducer and said first means for recording said control pulse on said medium and for recording said transducer signals on said medium, and a second means in said circuit for applying to said element said control pulse and said transducer signals for a period of time which is slightly greater than the time required for an acoustic pulse to travel said distance between said transmitter and said transducer by way of said fluid.

References Cited in the file of this patent
UNITED STATES PATENTS

| | | |
|---|---|---|
| 2,691,422 | Summers et al. | Oct. 12, 1954 |
| 2,708,485 | Vogel | May 17, 1955 |
| 2,729,803 | Harrison | Jan. 3, 1956 |
| 2,802,905 | Taris | Aug. 13, 1957 |
| 2,858,523 | Hawkins | Oct. 28, 1958 |
| 2,986,722 | Williams | May 30, 1961 |